United States Patent
Lin et al.

(10) Patent No.: US 8,108,006 B2
(45) Date of Patent: Jan. 31, 2012

(54) METHOD FOR DISPLAYING TIME ON A MOBILE TELEPHONE

(75) Inventors: Guanggang Lin, Shenzhen (CN); Fangxi Hou, Shenzhen (CN); Jianhua Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 751 days.

(21) Appl. No.: 11/720,194

(22) PCT Filed: Aug. 18, 2005

(86) PCT No.: PCT/CN2005/001292
§ 371 (c)(1),
(2), (4) Date: Jun. 4, 2008

(87) PCT Pub. No.: WO2006/056112
PCT Pub. Date: Jun. 1, 2006

(65) Prior Publication Data
US 2008/0268909 A1    Oct. 30, 2008

(30) Foreign Application Priority Data
Nov. 24, 2004    (CN) .......................... 2004 1 0065338

(51) Int. Cl.
*H04M 1/00* (2006.01)
(52) U.S. Cl. ...................................... 455/566; 455/550.1
(58) Field of Classification Search .................... 455/566
See application file for complete search history.

(56) References Cited

U.S. PATENT DOCUMENTS

| | | | | |
|---|---|---|---|---|
| 3,920,911 A * | 11/1975 | Lukas | ............................. | 379/122 |
| 5,247,160 A * | 9/1993 | Zicker | ........................... | 235/380 |
| 5,455,808 A * | 10/1995 | Grupp et al. | ..................... | 368/82 |
| 5,608,851 A * | 3/1997 | Kobayashi | ..................... | 345/591 |
| 5,771,348 A * | 6/1998 | Kubatzki et al. | .................. | 726/2 |
| 5,854,996 A * | 12/1998 | Overhage et al. | ............. | 702/189 |
| 5,954,820 A * | 9/1999 | Hetzler | ......................... | 713/323 |
| 6,278,499 B1 * | 8/2001 | Darbee et al. | .................. | 348/734 |
| 6,278,887 B1 * | 8/2001 | Son et al. | ....................... | 455/566 |
| 6,279,026 B1 * | 8/2001 | Clarke et al. | .................. | 718/102 |
| 6,295,002 B1 * | 9/2001 | Fukuda | ....................... | 340/636.1 |
| 6,476,714 B2 * | 11/2002 | Mizuta | ........................... | 340/461 |
| 6,486,893 B1 * | 11/2002 | Ramchandani et al. | ....... | 715/762 |
| 6,490,259 B1 * | 12/2002 | Agrawal et al. | ................ | 370/331 |
| 6,504,580 B1 * | 1/2003 | Thompson et al. | ............ | 348/734 |
| 6,553,223 B1 * | 4/2003 | Bayley et al. | .................. | 455/419 |
| 6,556,126 B1 * | 4/2003 | Imazuka et al. | ................ | 340/5.7 |
| 6,677,929 B2 * | 1/2004 | Gordon et al. | ................. | 345/156 |
| 6,687,730 B2 * | 2/2004 | Clarke et al. | .................. | 718/102 |
| 6,763,226 B1 * | 7/2004 | McZeal, Jr. | ................... | 455/90.2 |
| 6,853,911 B1 * | 2/2005 | Sakarya | ........................ | 701/208 |
| 6,870,531 B2 * | 3/2005 | Lee et al. | ...................... | 345/211 |

(Continued)

*Primary Examiner* — Yuwen Pan
*Assistant Examiner* — Hai Nguyen
(74) *Attorney, Agent, or Firm* — IP Strategy Group, P.C

(57) ABSTRACT

The present invention relates to a method for time display on a mobile phone. The method includes the following steps: step 1, in a standby state, set a pseudo power off identifier for the mobile phone; step 2, when the mobile phone identifies that the pseudo power off identifier is active, the mobile phone comes into a pseudo power off state; step 3, the mobile phone continually obtains a new time value through a physical layer clock, and displays the new time value on a LCD; and step 4, the mobile phone quits the pseudo power off state, and restarts. The present invention enables the mobile phone to display time without radio frequency signal by setting a third state, i.e., the pseudo power off state.

20 Claims, 1 Drawing Sheet

U.S. PATENT DOCUMENTS

Figure 1:
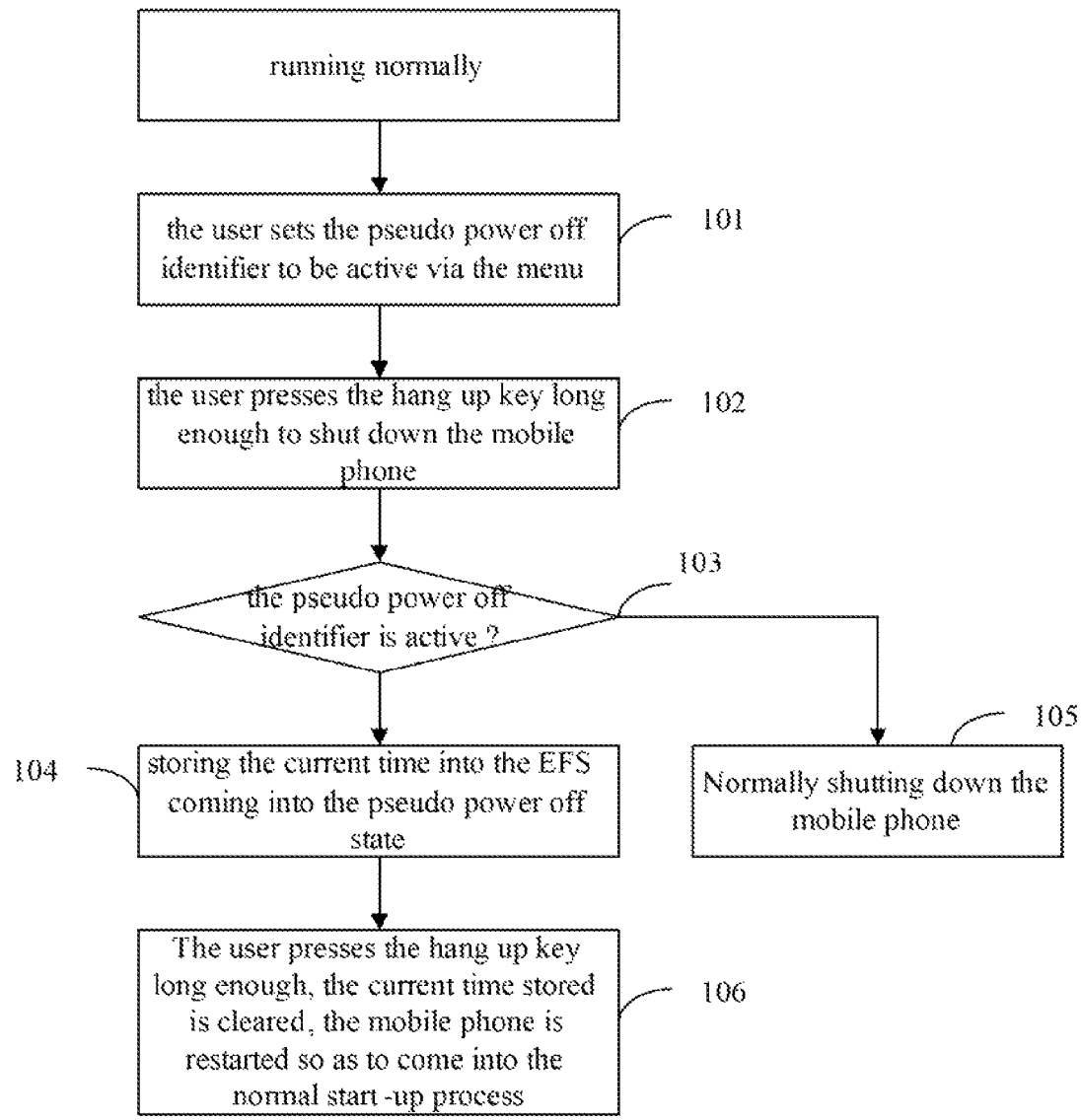

| | | | | |
|---|---|---|---|---|
| 6,889,055 | B1* | 5/2005 | Neufeld | 455/458 |
| 6,937,732 | B2* | 8/2005 | Ohmura et al. | 381/86 |
| 6,970,726 | B2* | 11/2005 | Takayanagi | 455/574 |
| 7,031,219 | B2* | 4/2006 | Hsu et al. | 365/226 |
| 7,058,432 | B2* | 6/2006 | Nishimoto | 455/575.1 |
| 7,181,178 | B2* | 2/2007 | Chow | 455/127.2 |
| 7,184,012 | B1* | 2/2007 | Kim | 345/100 |
| 7,184,745 | B2* | 2/2007 | Ballantyne et al. | 455/404.2 |
| 7,185,281 | B2* | 2/2007 | Farago et al. | 715/700 |
| 7,194,248 | B2* | 3/2007 | Kim | 455/343.1 |
| 7,218,973 | B2* | 5/2007 | Johnson et al. | 700/28 |
| 7,236,271 | B2* | 6/2007 | Silverbrook | 358/473 |
| 7,251,350 | B2* | 7/2007 | Tsirkel et al. | 382/118 |
| 7,254,479 | B2* | 8/2007 | Cheon | 701/200 |
| 7,292,494 | B2* | 11/2007 | Hsu et al. | 365/226 |
| 7,295,857 | B2* | 11/2007 | Joshi et al. | 455/550.1 |
| 7,334,138 | B2* | 2/2008 | Lu | 713/300 |
| 7,466,444 | B2* | 12/2008 | Silverbrook et al. | 358/1.18 |
| 7,590,871 | B2* | 9/2009 | Morisawa | 713/300 |
| 7,613,462 | B2* | 11/2009 | Willenegger et al. | 455/450 |
| 7,628,467 | B2* | 12/2009 | Silverbrook | 347/32 |
| 7,640,757 | B2* | 1/2010 | Lee | 62/129 |
| 7,715,036 | B2* | 5/2010 | Silverbrook et al. | 358/1.15 |
| 7,715,375 | B2* | 5/2010 | Kubler et al. | 370/353 |
| 7,730,232 | B2* | 6/2010 | Fujioka et al. | 710/33 |
| 7,742,447 | B2* | 6/2010 | Joshi et al. | 370/329 |
| 2001/0018700 | A1* | 8/2001 | Clarke et al. | 709/102 |
| 2001/0035817 | A1* | 11/2001 | Mizuta | 340/438 |
| 2001/0048749 | A1* | 12/2001 | Ohmura et al. | 381/86 |
| 2002/0065116 | A1* | 5/2002 | Chen et al. | 455/570 |
| 2002/0091790 | A1* | 7/2002 | Cubley | 709/217 |
| 2002/0155857 | A1* | 10/2002 | Nishimoto | 455/550 |
| 2003/0001817 | A1* | 1/2003 | Jeon | 345/156 |
| 2003/0058206 | A1* | 3/2003 | Lee et al. | 345/87 |
| 2003/0148760 | A1* | 8/2003 | Takayanagi | 455/420 |
| 2004/0077313 | A1* | 4/2004 | Oba et al. | 455/41.2 |
| 2004/0102167 | A1* | 5/2004 | Shim et al. | 455/226.2 |
| 2004/0107372 | A1* | 6/2004 | Morisawa | 713/300 |
| 2004/0176127 | A1* | 9/2004 | Ballantyne et al. | 455/552.1 |
| 2004/0185808 | A1* | 9/2004 | Chow | 455/127.2 |
| 2004/0254718 | A1* | 12/2004 | Cheon | 701/200 |
| 2005/0026575 | A1* | 2/2005 | Nagatomo | 455/127.1 |
| 2005/0052686 | A1* | 3/2005 | Maruyama | 358/1.15 |
| 2005/0070339 | A1* | 3/2005 | Kim | 455/572 |
| 2005/0094838 | A1* | 5/2005 | Tomoda et al. | 381/370 |
| 2005/0136999 | A1* | 6/2005 | Jeon | 455/575.3 |
| 2005/0215230 | A1* | 9/2005 | Cheng | 455/404.2 |
| 2005/0231380 | A1* | 10/2005 | Kamiya | 340/691.6 |
| 2005/0272445 | A1* | 12/2005 | Zellner | 455/456.2 |
| 2006/0020981 | A1* | 1/2006 | Paik | 725/81 |
| 2006/0068852 | A1* | 3/2006 | Doyle | 455/574 |
| 2006/0089134 | A1* | 4/2006 | Moton et al. | 455/418 |
| 2006/0114267 | A1* | 6/2006 | Park | 345/619 |
| 2006/0132294 | A1* | 6/2006 | Spark | 340/426.1 |
| 2006/0184973 | A1* | 8/2006 | de Heer et al. | 725/80 |
| 2007/0082693 | A1* | 4/2007 | Drucker et al. | 455/550.1 |
| 2007/0117574 | A1* | 5/2007 | Watanabe | 455/456.1 |
| 2007/0182703 | A1* | 8/2007 | Brubacher-Cressman et al. | 345/102 |
| 2007/0200659 | A1* | 8/2007 | Kim | 340/3.71 |
| 2007/0262946 | A1* | 11/2007 | Chen et al. | 345/102 |
| 2007/0279194 | A1* | 12/2007 | Carrender et al. | 340/10.4 |
| 2008/0261624 | A1* | 10/2008 | Moton et al. | 455/456.2 |
| 2009/0191926 | A1* | 7/2009 | Doyle | 455/574 |

* cited by examiner

METHOD FOR DISPLAYING TIME ON A MOBILE TELEPHONE

PRIORITY CLAIM

This application is related to and claims priority to a commonly assigned Chinese patent application entitled "A Method For Displaying Time on a Mobile Telephone," by Lin et al., Chinese Application Serial No. 200410065338.1 filed on Nov. 24, 2004, and to International PCT Application Serial No. PCT/CN2005/001292, filed Aug. 18, 2005, both of which are incorporated by reference herein.

TECHNICAL FIELD

The present invention relates to time display on a communication terminal, and especially, to time display on a mobile phone.

DESCRIPTION OF THE RELATED ART

In recent years, the mobile phone technology has developed quickly, which has made considerable progress in various aspects, such as the size of PCB board, standby current, process modeling, the performance of software, etc. In the application aspect of mainstream services, functions such as MMS, WAP, BREW, E-MAIL, etc. have been perfected continually and accepted by numerous consumers gradually. Many new applications based on the mobile phone have been invented by domestic and overseas research and development (R&D) engineers through continuous innovation and exploration. These more humanistic applications make the mobile phone accepted by various users as one of the necessary tools in daily life and objectively promote the prosperity of the mobile phone market.

The time display function is always one of the important functions of the mobile phone, brining much convenience to people. For example, many people do not wear a watch any more. However, typically the mobile phone only displays time in power on state, but cannot display time in power off state, causing inconvenience to people. In many environments that are sensitive to electronic interference, the mobile phone is not allowed to be used because the mobile phone will generate radio frequency signals in normal standby state, which may generate EMI (Electro Magnetic Interference) to some apparatuses and then incur safety problems (for example, on a plane). Also, some mobile phone users usually shut down their mobile phones in the night, as they, on the one hand, want to avoid radiation of the mobile phone, and on the other hand, to save power.

SUMMARY OF THE INVENTION

The present invention provides, in an embodiment, a method for time display on a mobile phone. The method of the present invention, in an embodiment renders that the mobile phone can display time in a non-standby state, wherein the non-standby state is a third state, i.e., a pseudo power off state, besides the standby state and the power off state. In the third state, the mobile phone can display time without generating radio frequency signal.

In order to achieve the above object, the present invention discloses a method for time display on a mobile phone, wherein the method comprises the following steps:

step 1, in a standby state, setting a pseudo power off identifier for the mobile phone;

step 2, when the mobile phone identifies that the pseudo power off identifier is active, the mobile phone coming into a pseudo power off state;

step 3, the mobile phone continually obtaining a new time value from a physical layer clock, and displaying the new time value on a LCD; and step 4, the mobile phone quitting the pseudo power off state, and restarting.

In the method according to the present invention, the step 2 further comprises the following step: when identifying that the pseudo power off identifier is active, the mobile phone stores current time to the storage system of the mobile phone; the step 3 further comprises the following step: the mobile phone obtains the current time stored in the storage system as a fiducial value for the time display, and obtains the new time value through continuous calculation by the physical layer bottom clock; and the step 4 further comprises the following step: the mobile phone clears the current time stored in the storage system when quitting the pseudo power off state.

In the step 2 of the above method, wherein the mobile phone judges whether the pseudo power off identifier is active through long by pressing the function key long enough.

In the abovementioned method, the step 2 further comprises a step of shutting down the mobile phone and restarting the mobile phone; wherein, the mobile phone shuts down when the function key is long pressed long enough, and the mobile phone identifies that the pseudo power off identifier is active, then stores the current time into the storage system of the mobile phone; after the current time is stored, the mobile phone restarts with tasks only relevant to the storage system, and the mobile phone comes into the pseudo power off state.

In the abovementioned method, in the step 2, after identifying the pseudo power off identifier, the mobile phone shuts down tasks except the tasks relevant to the physical layer clock of the system, then the mobile phone comes into the pseudo power off state, wherein the tasks which are shut down at least include a radio frequency task.

In the abovementioned method, in the step 4, the mobile phone quits the pseudo power off state by responding to an advanced interruption, and clears the current time stored in the storage system by calling an interruption function, then calls an endless loop function and restarts.

In the method according to the present invention, the advanced interruption is an event of pressing the function key long enough.

In the method according to the present invention, in an embodiment, the storage system is an embedded file system (EFS) of a CDMA mobile phone.

The method according to the present invention further comprises a step of judging whether the fiducial value obtained from the storage system is zero, if it is zero, the mobile phone will directly come into a normal starting process instead of the pseudo power off state, and if it is not zero, the mobile phone will come into the pseudo power off state.

The method according to the present invention further comprises a step of compensating the current time data stored in the storage system.

In the method according to the present, invention, in an embodiment, the step 3 further comprises the following steps:

step 3.1, setting a physical layer timer, the physical layer timer being able to generate interruption when the mobile phone is in a dormant state;

step 3.2, starting the physical layer timer;

step 3.3, turning off a fast clock temperature compensated crystal oscillator (TCXO), switching to a slow clock and entering a chip into a dormant mode;

step 3.4, when the physical layer timer expires, generating an interruption function, then calling the interruption function, and in the interruption function, switching the slow clock to the fast clock temperature compensated crystal oscillator, calculating the newest time data and refreshing the LCD to display the new time value; and step 3.5, re-setting the physical layer timer, turning off the fast clock temperature compensated crystal oscillator and entering into the dormant mode.

By setting a third state, i.e., the pseudo power off state, the present invention enables a mobile phone to display time when the mobile phone is not generating radio frequency signals.

BRIEF DESCRIPTION OF THE ACCOMPANYING DRAWINGS

FIG. 1 is a flow chart of an embodiment, for implementing the present invention.

EMBODIMENTS FOR CARRYING OUT THE PRESENT INVENTION

The invention will now be described in detail with reference to a few preferred embodiments, as illustrated in the accompanying drawings. In the following description, numerous specific details are set forth in order to provide a thorough understanding of the invention. It will be apparent, however, to one skilled in the art, that the invention may be practiced without some or all of these specific details. In other instances, well-known process steps and/or features have not been described in detail in order to not unnecessarily obscure the invention. The features and advantages of the invention may be better understood with reference to the drawings and discussions that follow.

The present invention realizes a third state which exists between the normal standby state and the power off state of a mobile phone. In this state, the mobile phone will not generate radio frequency signals, i.e., the mobile phone is invisible to a network, so the mobile phone will not generate EMI (Electro Magnetic Interference) to sensitive apparatuses, and the mobile phone will not radiate radio frequency to people; besides, the power consumption is very low and the current is at around 5 milliampere. Accordingly, the aim of saving power is achieved. There third state is hereinafter referred as a "pseudo power off state".

A technical solution for carrying out the present invention is as follows:
1. in a standby state, setting a pseudo power off identifier using a menu;
2. shutting down the mobile phone by pressing a function key (it is generally defined as a hang-up key) long enough, a mobile phone judging that the present pseudo power off identifier is active, and storing the current time in the storage system (as for the present CDMA mobile phone, it is the embedded file system (EFS), and as for the GSM criterion mobile phone, it need not store the current time) of the mobile phone; then the mobile phone restarting, and the mobile phone only restarting tasks relevant to the storage system, then the mobile phone coming into the pseudo power off state;
3. obtaining the current time stored as a fiducial value for time display before the restarting of the mobile phone, and continuously obtaining a new time value by way of continuous calculation by the physical layer clock (as for the GSM criterion mobile phone, the physical layer clock data can be obtained directly), and displaying the new time value on a LCD, the present state being the pseudo power off state; and,
4. in the pseudo power off state, the mobile phone software setting the event of pressing the function key long enough as an advanced interruption, wherein at this time, if the function key is pressed long enough, the mobile phone will quit the pseudo power off state, call an interruption function, clear the time stored in the storage system of the mobile phone, and then call an endless loop function and restart.

Another technical solution for carrying out the present invention is as follows:
1. in a standby state, setting a pseudo power off identifier using a menu;
2. pressing the function key long enough, if mobile phone software judges that the pseudo power off identifier is active currently, then shutting down the tasks such as radio frequency related tasks except for the system clock;
3. obtaining the time stored in the mobile phone as a fiducial value for the time display, and obtaining a new time value continuously by way of continuous calculation by the physical layer clock, displaying the new time value on a LCD, the present state being the pseudo power off state; and
4. in the pseudo power off state, the mobile phone software setting the event of pressing the function key long enough as an advanced interruption, wherein at this time, if the function key is pressed long enough, the mobile phone will quit the pseudo power off state, call an interruption function, clear the time stored in the storage system of the mobile phone, and then call an endless loop function and restart.

The differences between the first and the second technical solutions lie in from the standby state to the pseudo power off state, the manner of shutting down the tasks irrelevant to the pseudo power off function, and whether the mobile phone needs to restart.

FIG. 1 is a flow chart of an embodiment for implementing the present invention, which mainly comprises the following steps:

Step 1: in the standby state, a user sets the pseudo power off identifier to be active using a menu, and stores the pseudo power off identifier in the non-volatile memory (step 101);

Step 2: shut down the mobile phone by pressing the function key long enough (step 102). The mobile phone software judges whether the present pseudo power off identifier is active (step 103), wherein if it is not active, the mobile phone will shut down normally (step 105), or if the mobile phone software judges the present pseudo power off identifier is active, then store the current time into the EFS (as for the GSM criterion mobile phone, it need not store time) and comes into the pseudo power off state (step 104). In the software system of QUALCOMM, the value of the current time to be stored is an integer value of double bytes, which represents the seconds passing from zero o'clock, zero minute, zero second on Jan. 6, 1980 until now. The time information in the format of hour, minute, and second that we usually see on the CDMA (Code Division Multiple Access) mobile phone actually is obtained through transformation of the integer value of double bytes.

In the EFS system, data are stored in the form of file, therefore, the integer value of double bytes is stored in a file with a predetermined name, and the integer value of double bytes in the file still occupies two bytes.

After time data is stored successfully, by calling an endless loop function, a watchdog is removed in due time and the mobile phone restarts;

Step 3: restart the mobile phone, and after the EFS task is restarted, open the file in which the time data is stored, obtaining the time data and judging whether it is zero. If the time data is not zero, the mobile phone stops starting other tasks in a software procedure, takes the time data as the fiducial value for the time display, obtains new time values continually by way of continuous calculation by the physical clock, and displays the new time values on the LCD. The state at this time is the pseudo power off state. If the time data is zero, it is thought that the starting of this time does not make the mobile phone come into the pseudo power off state, but directly come into a normal starting process, and the mobile phone starts other tasks.

In the above circumstance where the time data is not zero, because only the EFS task is started, and other radio frequency-related tasks are not started, so it guarantees that no radio frequency signal is generated.

In order to display time more accurately, certain compensation should be made to the time data obtained after restarting, because there is certain time delay between storing data before starting and obtaining the time data for displaying after the starting. The time delay can be estimated through a test. For products of different platforms, associated time delay periods have certain differences. On the other hand, the pseudo power off state relies on the physical layer interruption to arouse the mobile phone and display time, and it also will produce time delay in this process; this time delay needs to be compensated, too.

When the mobile phone comes into the pseudo power off state, the following steps needs to be executed:

setting a physical layer timer, which functions to generate interruption and activates software by the interruption function when the mobile phone is in the dormant state;

starting the physical layer timer;

shutting down the fast clock TCXO (Temperature Compensated Crystal Oscillator), switching to the slow clock, and entering the chip into a dormant mode;

when the physical layer timer expires, an interruption will be generated, then calling the interruption function, and in the interruption function, switching the slow clock to the fast clock TCXO, calculating the newest time data and refreshing the LCD to display the new time value; and re-setting the physical layer timer, shutting down the fast clock TCXO and entering into the dormant mode.

From the abovementioned steps, it can be seen that the mobile phone is actually in a non-stop circulation process of "arousing-displaying-dormant-re-arousing". Compared with the dormant time (set to be 6 seconds in actual products), the time for the software to arouse to display the newest data is very short, which is on the millisecond level, so when in the pseudo power off state, most time of the mobile phone is in the dormant state, and it can save the power a lot in this state accordingly.

Step 4: in the pseudo power off state, the event of pressing the function key long enough is set to be the advanced interruption in the mobile phone software. At this time, in response to pressing the function key long enough, the mobile phone will call an interruption function, and modify the time value stored in the EFS into zero in the interruption function so as to guarantee that mobile phone will enter the normal starting flow next time, then call an endless loop function and restart.

Step 5: after restarting, the mobile phone obtains the time data stored in the EFS; if the time data is more than zero, the pseudo power off program will be started, or, if the time data is zero, it will enter into the normal starting flow (step 106).

1. When the user does not need the pseudo power off state, the user should clear the pseudo power off identifier. If the user has not cleared the pseudo power off identifier in the menu, the mobile phone will come into the pseudo power off state when shutting down the mobile phone each time, until the pseudo power off identifier is cleared.

2. What needs to be explained is that the present invention adapts to mobile terminals of criterion such as CDMA1X, GSM, PHS, WCDMA, TD-SCDMA, CDMA2000, and other terminals such as fixed-station and vehicle-mounted station.

INDUSTRIAL APPLICABILITY

1. By adopting the method and mobile phone of the present invention, the mobile phone can display time when the mobile phone is in a non-power off state, and can display time in the third state, which exists between the normal standby state and the power off state of the mobile phone. In the third state, on the one hand, the mobile phone does not generate radio frequency signals, i.e., the mobile phone is invisible to the network, so it will not generate EMI (Electro Magnetic Interference) to sensitive apparatuses, and there is no radiation of radio frequency to people; and on the other hand, the power consumption is very low and the current is at around 5 milliampere, accordingly, achieving the aim of saving power.

While the invention has been described in terms of several preferred embodiments, there are alterations, permutations, and equivalents which fall within the scope of this invention. Further, the summary and abstract are provided for convenience only and should not be construed to limit the scope of the invention. It is therefore intended that the following appended claims be interpreted as including all such alterations, permutations, and equivalents as fall within the true spirit and scope of the invention.

What is claimed is:

1. A method for time display on a mobile phone, comprising the following steps:

step 1, in a standby state, setting a pseudo power off identifier for the mobile phone;

step 2, the mobile phone being shut down by long pressing a function key when the mobile phone identifies that the pseudo power off identifier is active, the mobile phone coming into the pseudo power off state, in which the mobile phone does not generate radio frequency signals;

step 3, the mobile phone continually obtaining a new time value from a physical layer clock, and displaying the new time value on a LCD; and step 4, the mobile phone quitting the pseudo power off state, and restarting.

2. The method according to claim 1, wherein the step 2 further comprises when identifying that the pseudo power off identifier is active, the mobile phone store current time to a storage system of the mobile phone;

the step 3 further comprises: the mobile phone obtains the current time stored in the storage system as a fiducial value for time display, and obtains the new time through continuous calculation by bottom physical layer clock; and the step 4 further comprises: the mobile phone clears the current the stored in the storage system when quitting the pseudo power off state.

3. The method according to claims 2, wherein in the step 2, the mobile phone judges whether the pseudo power off identifier is active by long pressing the function key.

4. The method according to claim 2, wherein the step 2 further comprises a step of shutting down and restarting the mobile phone; wherein the mobile phone shuts down when the function key is long pressed, and the mobile phone identifies that the pseudo power off identifier is active, then stores the current time into the storage system of the mobile phone; after the current time is stored, the mobile phone restarts with tasks only relevant to the storage system, and the mobile phone comes into the pseudo power off state.

5. The method according to claims 4, wherein in the step 4, the mobile phone quits the pseudo power off state by responding to an advanced interruption, and clears the current time stored in the storage system by calling an interruption function, then calls an endless loop function and restarts.

6. The method according to claims 4, wherein the method further comprises a step of judging whether the fiducial value obtained from the storage system is zero, if it is zero, the mobile phone will directly come into a normal starting process instead of the pseudo power off state, and if it is not zero, the mobile phone will come into the pseudo power off state.

7. The method according to claim 2, wherein in the step 2, after identifying the pseudo power off identifier, the mobile phone shuts down tasks except tasks relevant to the physical layer clock of the mobile phone, then the mobile phone comes into the pseudo power off state, wherein the tasks which are shut down at least include a radio frequency task.

8. The method according to claims 7, wherein in the step 4, the mobile phone quits the pseudo power off state by responding to an advanced interruption, and clears the current time stored in the storage system by calling an interruption function, then calls an endless loop function and restarts.

9. The method according to claims 7, wherein the method further comprises a step of judging whether the fiducial value obtained from the storage system is zero, if it is zero, the mobile phone will directly come into a normal starting process instead of the pseudo power off state, and if it is not zero, the mobile phone will come into the pseudo power off state.

10. The method according to claim 2, wherein the storage system is an embedded file system (EFS) of a CDMA mobile phone.

11. The method according to claims 10, wherein the method further comprises a step of judging whether the fiducial value obtained from the storage system is zero, if it is zero, the mobile phone will directly come into a normal starting process instead of the pseudo power off state, and if it is not zero, the mobile phone will come into the pseudo power off state.

12. The method according to claim 2, characterized in that it further comprises a step of judging whether the time reference value obtained from the storage system is zero, if it is zero, the mobile phone will directly come into a normal starting process, but not into a pseudo power off state, and if it is not zero, the mobile phone will come into the pseudo power off state.

13. The method according to claim 12, wherein the method further comprises a step of compensating the current time stored in the storage system.

14. The method according to claim 2, wherein in the step 4, the mobile phone quits the pseudo power off state by responding to an advanced interruption, and clears the current time stored in the storage system by calling an interrupt function, then calls an endless loop function and restarts.

15. The method according to claim 14, wherein the advanced interruption is an event of long pressing the function key.

16. The method according to claims 15, wherein the method further comprises a step of judging whether the fiducial value obtained from the storage system is zero, if it is zero, the mobile phone will directly come into a normal starting process instead of the pseudo power off state, and if it is not zero, the mobile phone will come into the pseudo power off state.

17. The method according to claim 2, wherein the step 3 further comprises:
step 3.1, setting a physical layer timer, and the physical layer timer being able to generate interruption when the mobile phone is in a dormant state;
step 3.2, starting the physical layer timer;
step 3.3, turning off a fast clock temperature compensated crystal oscillator, switching to a slow clock and entering a chip into a dormant mode;
step 3.4, when the physical layer timer expires, an interruption function being generated, then calling the interruption function, and in the interruption function, switching the slow clock to the fast clock temperature compensated crystal oscillator, calculating the newest time data and refreshing the LCD to display the new time value; and
step 3.5, re-setting the physical layer timer, turning off the fast clock temperature compensated crystal oscillator and entering into the dormant mode.

18. The method according to claim 1, wherein in the step 2, the mobile phone judges whether the pseudo power off identifier is active by pressing the function key for the extended period of time.

19. The method according to claim 1, wherein in the step 4, the mobile phone quits the pseudo power off state by responding to an advanced interruption, and clears the current time stored in the storage system by calling an interruption function, then calls an endless loop function and restarts.

20. The method according to claim 1, wherein the
step 3.1, setting a physical layer timer, and the physical layer timer being able to generate interruption when the mobile phone is in a dormant state;
step 3.2, starting the physical layer timer;
step 3.3, turning off a fast clock temperature compensated crystal oscillator, switching to a slow clock and entering a chip into a dormant mode;
step 3.4, when the physical layer timer expires, an interruption function being generated, then calling the interruption function, and in the interruption function, switching the slow clock to the fast clock temperature compensated crystal oscillator, calculating the newest time data and refreshing the LCD to display the new time value; and
step 3.5, re-setting the physical layer timer, turning off the fast clock temperature compensated crystal oscillator and entering into the dormant mode.

* * * * *